(No Model.)
H. F. MANN.
CAR WHEEL.
No. 433,950. Patented Aug. 12, 1890.
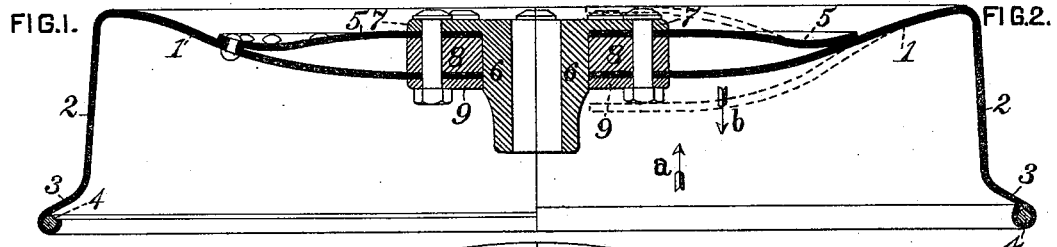
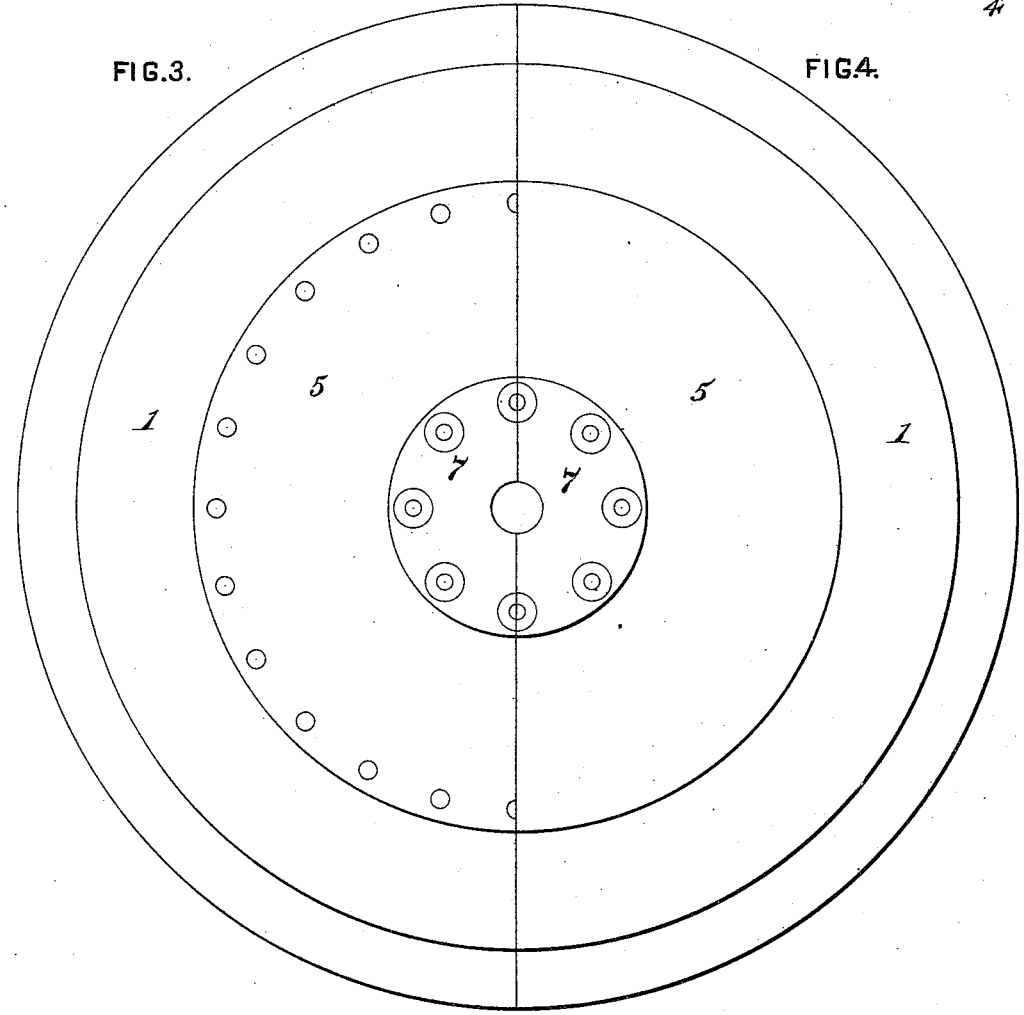
WITNESSES:
INVENTOR,
Henry F. Mann
by George H. Christy Att'y.

UNITED STATES PATENT OFFICE.

HENRY F. MANN, OF ALLEGHENY, PENNSYLVANIA.

CAR-WHEEL.

SPECIFICATION forming part of Letters Patent No. 433,950, dated August 12, 1890.

Application filed June 24, 1889. Serial No. 315,351. (No model.)

*To all whom it may concern:*

Be it known that I, HENRY F. MANN, a citizen of the United States, residing at Allegheny, in the county of Allegheny and State of Pennsylvania, have invented or discovered certain new and useful Improvements in Car-Wheels, of which improvements the following is a specification.

The invention described herein relates to certain improvements in the construction of wrought-iron or steel car-wheels, and has for its object not only a re-enforcement of the flange, but also increasing its width, so as to serve as a guide for the wheel in passing over frogs, switches, and crossings, and also to form a broader bearing-surface, so as to prevent injury to the ties and platform when the truck or vehicle is removed from the track; and it is a further object of the invention to re-enforce the web of the wheel against lateral shocks and strains.

In the accompanying drawings, forming a a part of this specification, Figure 1 is a sectional view of one-half of a car-wheel embodying my invention; Fig. 2 is a similar view of a modified form of the wheel; Figs. 3 and 4 are views in side elevation of the wheels shown in Figs. 1 and 2, respectively; and Fig. 5 is a sectional detail of a further modification.

In the practice of my invention the edge of a circular disk 1, of suitable dimensions is turned over to or approximately to a right angle to the body of the disk, said turned-over portion being of sufficient width for the formation not only of the tread 2 and flange 3, but also for the formation of a bead along the edge of the flange, which is formed by bending outwardly the edge of the portion turned over in forming the tread 2.

In forming the flange 3 metal of a width greater than that required for the flange should be bent outwardly, as above stated. This excess of metal is then bent over a ring 4, formed of heavy wire or wire rod. The metal inclosing the ring 4 may extend only partially around the wire, as shown in Fig. 1, may be made to entirely embrace the ring, as shown in Fig. 2, and the wire, wire rod, or tube forming the ring 4 may be round in cross-section, as shown in Figs. 1 and 2, or angular, as shown in Fig. 3, or it may be tubular, as the uses to which the wheel is to be put may require. It will be observed that by bending the metal over the wire the flange of the wheel is made sufficiently wide or thick to properly guide the wheel in passing over frogs, switches, and crossings—a function which this class of wheels as now constructed of a single thickness of metal does not properly perform; and, further, in addition to the increased thickness or width of flange attained by the insertion of the wire or tube, as hereinbefore stated, the wire serves to strengthen the tread and the walls of the flange as against the strains of service to which it may be subjected, and thereby prevents a closing in of the outer wall, as might be the case when the wheels are made of thin metal and the desired thickness of flange attained by simply bending out the metal.

In order to re-enforce the web, which is dished, as shown, to enable it to better endure the strains of service, a concavo-convex metal disk 5 is secured to the web by rivets, as shown in Fig. 2. The disk is arranged with its convex surface outward—that is to say, the disk is so placed that the concave surfaces of the disk and web shall be adjacent to each other, so that one shall re-enforce the other in the direction of the least rigidity. The web and disk are secured to the hub 6, which is provided with a flange 7 at one end, by bolts or rivets passing through said flange, an annular distance-block 8 interposed between the disk and web, and a washer 9, arranged outside of the web or disk.

In lieu of securing the disk to the web by rivets, as shown in Figs. 1 and 3, the web and disk may be made with a deeper dish, as indicated by dotted lines in Fig. 2, than required to obtain the relative adjustment of the disk and web, as shown in Fig. 1, so that when said parts are placed together, with the edges of the disk resting upon the web, the distance between the two will be greater than desired in the finished wheel, and considerable power will be required to draw them into proper relation on the hub. It will be obvious that when so drawn into position the disk and web will bear against each other with a pressure proportional to force required to bring them into the desired relation, and being under a strain will offer a more prompt and greater resistance as against lateral strains—as, for example, in the arrangement of the disk and web shown in Fig. 2 the web will resist any outward strains in the direction of the arrow $a$, while the disk 5 will operate similarly as against strains in the direction of the arrow $b$.

While I have shown a wheel in which the web is formed integral with the tread, I do not wish to limit myself to such a construction, as my invention is readily applicable to wheels wherein the web and tire are formed independent of each other and secured together by bolts or other suitable means.

I am aware that it is old in the manufacture of thin sheet-metal vessels to incorporate a wire ring in the edges thereof; but in the manufacture of car-wheels the object to be attained is entirely different. The rail-flange of a car-wheel—an element not found in sheet-metal vessels—must be so constructed of a sufficient width as to serve as a guide for the wheel in passing over frogs, switches, and crossings, and at the same time possess sufficient stength to endure the strains of service. In order to obtain such a width or thickness of rail-flange in plate or sheet metal wheels, the metal of the flange must be bent to or approximately to a U shape; but when the wheel or tire is formed of thin sheet metal the strains and blows to which the flange is subjected produce distortions, as well as indentations, which will act as a broken or clipped flange of a cast-iron car-wheel, thereby greatly impairing its usefulness. By the insertion of the wire a comparatively solid flange is formed, thereby overcoming all liability of such distortions or indentations, adding greatly to the strength and efficiency of the wheel.

I claim herein as my invention—

1. A wrought-iron or steel car-wheel having its flange-edge wired, substantially as set forth.

2. A wrought-iron or steel car-wheel having, in combination, a web, a tread connected to the web, and a flange having a wired edge, substantially as set forth.

3. A wrought-iron or steel car-wheel having, in combination, a hub, a concavo-convex web secured to the hub, a concavo-convex re-enforcing disk bearing at its edges only on the web, the web and disk being held together and to the hub under strain, a tread secured to the web, and a re-enforced flange, substantially as set forth.

In testimony whereof I have hereunto set my hand.

HENRY F. MANN.

Witnesses:
W. B. CORWIN,
DARWIN S. WOLCOTT.